UNITED STATES PATENT OFFICE.

CHARLES W. RENWICK, OF ISABELLA, TENNESSEE.

PROCESS FOR ROASTING SULFID ORES.

981,880.

Specification of Letters Patent. Patented Jan. 17, 1911.

Application filed May 14, 1910. Serial No. 561,276.

*To all whom it may concern:*

Be it known that I, CHARLES W. RENWICK, of Isabella, in the county of Polk and State of Tennessee, have invented certain new and useful Improvements in Processes for Roasting Sulfid Ores, of which the following is a specification.

In the manufacture of sulfuric acid from metallic sulfid ores, the ores are roasted to oxids. In the ordinary roasting the ore is fed into a roasting furnace at the top and caused to pass down through several heated ovens or hearths to the bottom hearth from which it passes out of the furnace; and, the air or oxygen is admitted at the bottom ovens and caused to pass up through the several ovens to the top one and out through a stack connected therewith. All metallic sulfid ores are thus roasted to oxids, and, as is well known, metallic oxids act as catalytic agents and in this case $SO_2$ is thereby converted into $SO_3$. The heat of such furnace is produced by the burning of oil or other suitable fuel and the upper hearths are hottest. As the ore travels downward and the $SO_2$ and other sulfurous gases pass upward through the furnace the most limited catalysis is produced.

It is the object of my improvement to reverse the current of the gases and cause the same to travel from the top oven down with the ore in order to carry the high temperature found in the top ovens down to the lower ovens for the better roasting of the ores and in order to have the $SO_2$ come in more frequent contact with the metallic oxids so that greater quantities of $SO_2$ will be converted into $SO_3$.

I have attained this object in the roasting process hereinafter described and claimed.

The accompanying drawings illustrate the preferred form of apparatus employed by me for carrying said process into practical effect.

Figure 1:
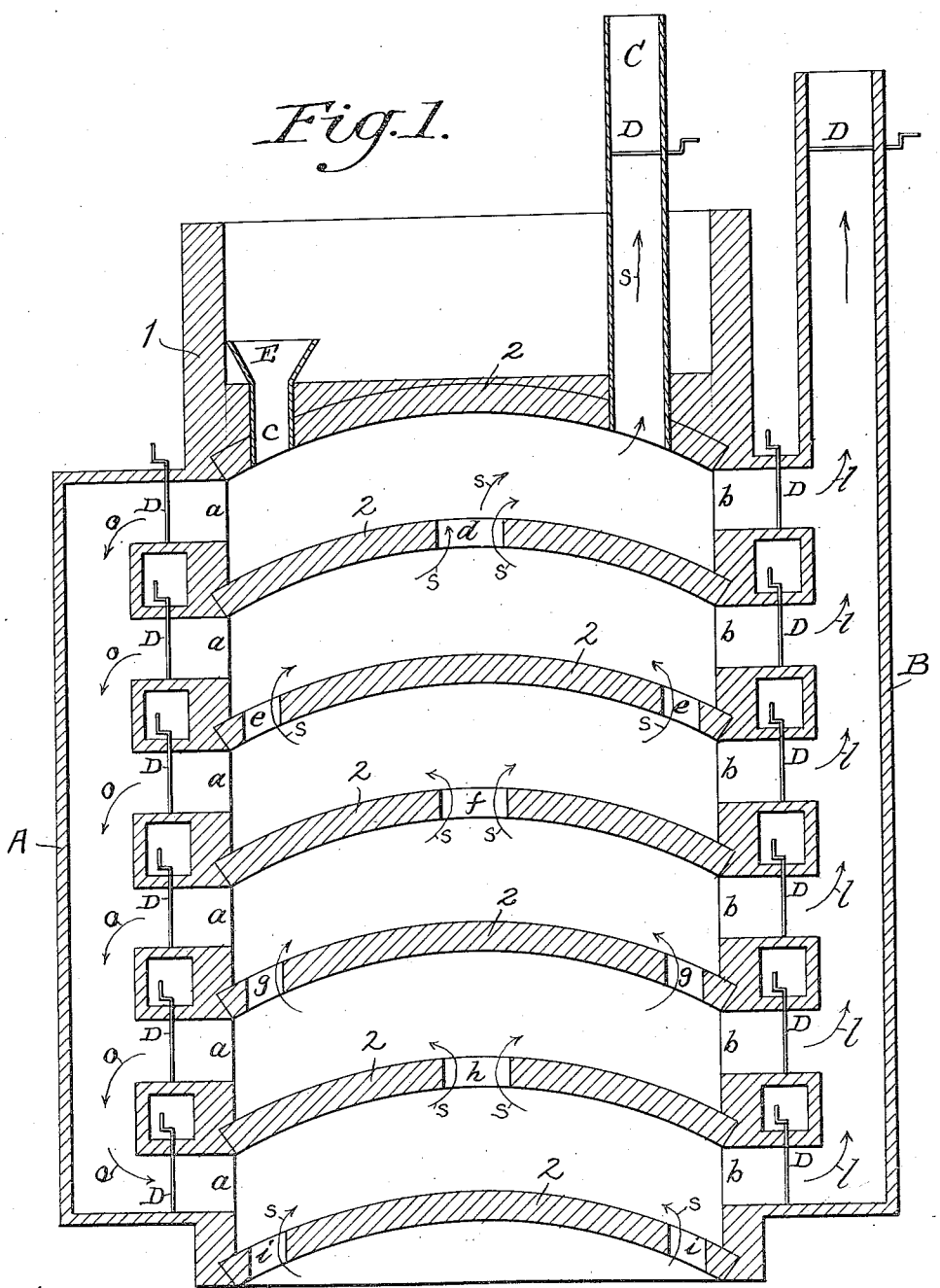
Figure 2:
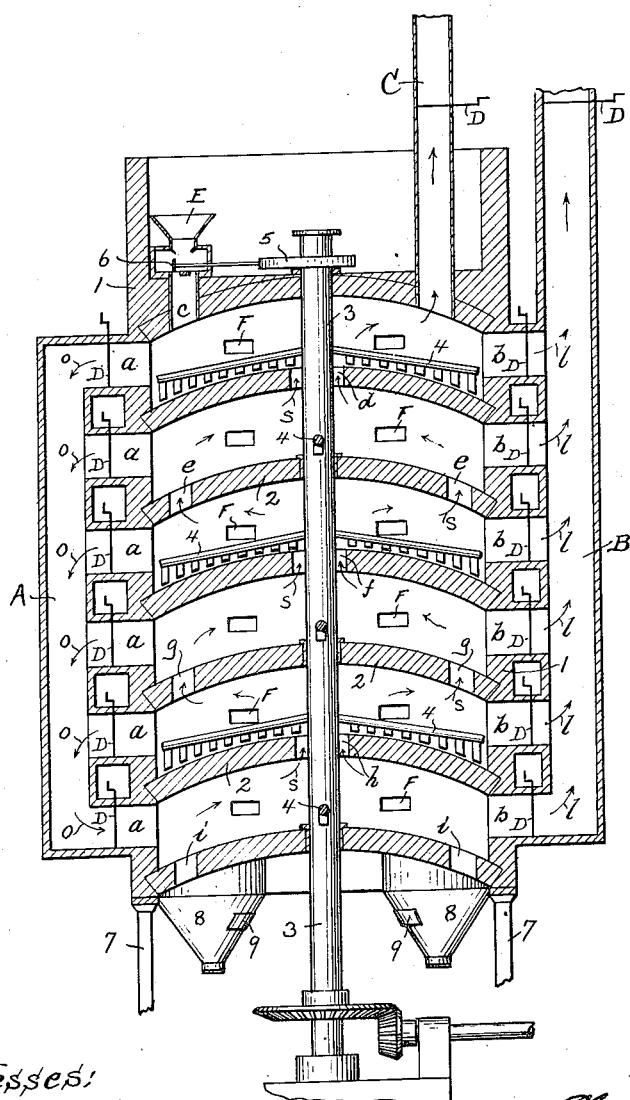

Figure 1 of said drawings is a vertical central section of an ordinary furnace shell provided with flues and dampers for reversing the current of gases in the furnace and Fig. 2 is a like section and shows rotary rakes in elevation for moving the ore in the ovens, and other features additional to those shown in Fig. 1.

Two vertical flues are provided, on opposite sides of the furnace shell, one for drawing off all or a part of the gases from any of the upper ovens and entering them into the lower ovens, and one for drawing off all or a part of the gases, depending on the amount of conversion desired, and carrying them to the place of use.

In the drawings 1 is the furnace shell, and 2 arched floors separating the roasting ovens or forming roasting hearths. The upper floor has an exit opening for a stack C through which the gases pass to the place where they are to be used, and a feed opening $c$ provided with a hopper E for feeding the ore into the furnace on the floor next below the top one. From this the ore is caused to pass on down through the floor openings $d, e, f, g, h, i$, by means of ordinary rotary rakes, going out of the furnace at openings $i$ in the bottom floor. The rotary rakes comprise a vertical rotary shaft 3 extended up through central openings in the floors 2 and provided with radial arms 4 for each hearth, said arms carrying bladelike teeth on their under side adapted to scrape the floor and being set at an incline to their path of travel so that said teeth will either pull the ore to the central openings or push it to the peripheral openings. The foot of said shaft may be journaled in a cross piece and provided with operating gear for slowly rotating the shaft to work the rakes. At its upper end said shaft carries an eccentric 5 which operates a scraper 6 for stirring the ore in a box beneath the hopper E and over the feeding opening $c$ to prevent clogging of said opening.

The shell of the furnace is supported on piers or columns 7, and beneath the openings $i$ are hoppers 8 which are adapted to catch the cindered ore and conduct it to a spout for conveying it to the place of storage. These hoppers close the openings $i$ and may have dampered openings 9 (any well known damper device may be used) whereby communication of the openings $i$ may be cut off from the outer atmosphere. Air or oxygen can be let in at the top through opening $c$ or stack C and the shell wall is provided with air openings in each of the ovens having dampers F for controlling the supply of air or oxygen for combustion. The air or oxygen and gases enter at the bottom through openings $i$ and pass, as indicated by arrows $s$, up through openings $h, g, f, e, d$ and then out through the stack C when the furnace is working according to the ordinary process.

The reversal of the current of gases is effected by means of flues A and B placed at opposite sides of the furnace body and having branches $a$ $b$ provided with dampers D which communicate through openings in the furnace shell with the several ovens between the floors 2 so that when the damper D in stack C is closed the gases can be taken from any of the upper ovens and entered into lower ovens and can be passed into flue B, or can circulate up in the ordinary way after subjecting the desired quantity of $SO_2$ to catalytic action, the damper in the stack C being opened for this purpose. By closing the dampered openings and all of the dampers D except the one in the lowermost branch flue $b$ the entire draft will be downward in the furnace shell and through the openings $d$, $e$, $f$, $g$, $h$, and upward through the flue B, air being let in at the oven top. By an obvious manipulation of the dampers D in the branch flues $a$ $b$ all or a part of the gases can be taken from any of the floors through the flue B, depending on the amount of conversion desired. All or a part of the gases may be drawn off from any of the upper floors, and turned down through flue A as indicated by arrows $o$ to any of the lower floors and carried over to the flue B as indicated by arrows $l$, the dampers D being opened in the branch flues $a$ $b$ at the point or points where it is desired the gases shall pass out of certain of the ovens and into certain other of them and thence on to the flue B or stack C as desired.

The new roasting process consists in reversing the current of gases in the manner described in order to increase the temperature at the bottom of the furnace and to cause the $SO_2$ in the furnace to come into more frequent contact with the metallic oxids. The increase of temperature at the bottom is very valuable in the roasting of the ores for the reason that the last traces of sulfur are hardest to remove and the high temperature is thereby brought into contact with the ore on the lower hearths and completely oxidizes the same without any extra cost. The ore on the lower hearth is so heated that all sulfates are broken up and a sweet roast is obtained. These things have not been heretofore attained, so far as I am aware, by any single operation, but resort has always been had to separate and distinct operations for their accomplishment.

Extending the travel of the gases in the roasting furnace by reversing the current of their travel and causing the same to be downward with the ore for a portion of the time is very valuable, in the manufacture of sulfuric acid for the reason that it greatly increases the frequency of contact of $SO_2$ with the hot metallic oxids and greatly increases the quantity of $SO_2$ that is converted into $SO_3$. This greatly reduces the cost of producing sulfuric acid. The reversing of the current of the gases causes the dust to settle in the ovens and pass off with the ore, so that the $SO_3$ passing in the flues B C to the place of use is much more free from dust than when roasted in the ordinary way.

What I claim is:

1. The improved process for roasting metallic sulfid ores, which consists in passing the ores downward through a series of hot roasting ovens, introducing air or oxygen into the lowermost of said series of ovens and causing it to pass upward through said ovens to the uppermost one of them, and then reversing the current of said gases from said upper oven and carrying the said gases downward and reintroducing the same into lower ovens of said series, as specified.

2. The improvement in processes for roasting metallic sulfid ores which consists: first in subjecting a moving mass of such ores to the action of a current of hot air, or oxygen, and sulfurous gas having movement in a direction contrary to the movement of the ore, and second, subjecting said mass of moving ore to the action of a current of hot air, or oxygen, and sulfurous gas having movement in a direction the same as that of said ore, substantially as and for the purposes specified.

C. W. RENWICK.

Witnesses:
G. B. FARISS,
W. L. HEINZ.